United States Patent [19]

Scalet

[11] 4,260,400
[45] Apr. 7, 1981

[54] DEVICE FOR POWDER RECOVERY FROM POWDER-SPRAY HOUSINGS

[75] Inventor: Arno Scalet, Fl-Schaan, Liechtenstein

[73] Assignee: Interesco International Research Corporation, Liechtenstein, Fed. Rep. of Germany

[21] Appl. No.: 25,812

[22] Filed: Apr. 2, 1979

[30] Foreign Application Priority Data

Mar. 31, 1978 [DE] Fed. Rep. of Germany ....... 2813854

[51] Int. Cl.³ ............................................. B01D 46/36
[52] U.S. Cl. ....................................... 55/290; 55/301; 55/353; 55/432; 98/115 SB; 118/634
[58] Field of Search .......... 55/290, 293, 432, 301–305, 55/351–354; 98/115 SB; 118/634

[56] References Cited

U.S. PATENT DOCUMENTS

| 2,012,250 | 8/1935 | Rundell | 55/351 X |
| 2,242,277 | 5/1941 | Yonkers, Jr. | 55/293 |
| 2,256,665 | 9/1941 | Carson | 55/290 |
| 3,212,239 | 10/1965 | Maestrelli | 55/290 |
| 3,395,518 | 8/1968 | Krane | 55/290 |
| 3,395,972 | 8/1968 | Hardison | 98/115 SB X |
| 3,902,455 | 9/1975 | Lehmann et al. | 98/115 SB X |
| 4,133,657 | 1/1979 | Krogsrud | 55/290 |
| 4,153,008 | 5/1979 | Marino et al. | 55/290 X |

Primary Examiner—Richard L. Chiesa
Attorney, Agent, or Firm—Allison C. Collard; Thomas M. Galgano

[57] ABSTRACT

A device for recovering powder, in particular from powder-spray housings, includes a filter unit mounted in a separate housing, which unit has at least one filter element mounted between the crude gas side and the pure gas side thereof. The pure gas side is coupled to an exhaust and a cleaning device is provided for the filter element for a continuous removal of the drawn-in powder. The filter element is moveable along a pure gas channel as an endless filter band fed around a drive roller and a tension roller. The band has opposed band portions which form the separation between the crude gas side and the pure gas side and which are subjected to a subsequent cleaning device.

11 Claims, 4 Drawing Figures

DEVICE FOR POWDER RECOVERY FROM POWDER-SPRAY HOUSINGS

The present invention relates to a device for recovering powder. More particularly, it relates to a device for recovering powder from powder-spray housings having a filter unit mounted in a separate housing. The filter unit of this device typically has at least one filter element mounted between the crude or impure gas side and the pure gas side, the latter side of which is coupled to an exhaust. In such devices, a cleaning device is also provided for the filter element so as to effect a continuous removal of the drawn-in powder.

In devices of this type, it was hitherto quite common to form the filter unit as a separate unit which was detachably coupled to a powder-spray housing in the bottom thereof by means of a suction line. However, for the past few years the trend has been to use filter units which are integrated in the spray housing, wherein the housing bottom is formed by a filter band which runs out of the housing through a seal and is then cleaned. This type of construction has various advantages but it also has some considerable disadvantages. In particular, the total cost is substantially higher than in the case of separated devices. In addition, the housing can only be entered over a grate which is placed over the filter band and which still results in slight damage to the low resistant, fleece-type filter band due to tools which may be accidentally dropped, different lateral and longitudinal stresses, and the like. In this type of structure there is also the possibility that the powder may suddenly enter the pure gas chamber. In such a case, the spraying operation must be immediately interrupted and the band must be replaced which, in the known devices, is relatively cumbersome and time consuming.

The present invention is based on the realization that the commonly-known structure with separate filter units is more economical in principle than the integrated structures.

It is therefore an object of the present invention to provide a device of the aforementioned type which is simple and compact and which can be operated safely with a relatively large filter capacity.

The solution to this object of the invention is achieved in that the filter element in accordance with the invention is an endless filter band which is received about spaced-apart drive and tension rollers and is moved along a pure gas channel. The band has two band portions which form the separation between the crude or impure gas side and the pure gas side, and which are subjected to a subsequent cleaning device.

By mounting the very sensitive known filter bands in a separate chamber which is completely closed off to the outside, the disadvantages and damage caused to the band in integrated devices are eliminated and the operating interferences caused thereby are also eliminated. Therefore, the advantageous characteristics of the filter band namely, the extremely high surface load-carrying capacity and the ability of rapid color change can be fully taken advantage of. At least in the center portion of the filter band which is enclosed air is drawn through the filter band from two sides. Thereby, the capacity with respect to the surface available is doubled in contrast to commonly-known devices, so that the filter band may be charged with a free air capacity of about 17 to 20 $m^3$ air/$m^3$ per minute.

The spray housing is freely accessible independently of the fact of whether a special walk grate is provided or not; i.e., the cleaning of the same is substantially facilitated. The filter bands are readily accessible and can be easily replaced due to detachable sidewalls of the filter unit. Since neither the housing nor the filter unit has to be taken into consideration with respect to each other when constructing the device, it is possible to provide economical devices which can be easily assembled and dismantled. If sufficient coupling possibilities are present, one or a plurality of housings may be combined with one or a plurality of filter units, whereby each filter unit may be provided with a plurality of filter bands which may be used selectively. In this manner, there are unlimited possibilities.

In particular, a plurality of exhausts may be provided to balance the exhaust conditions in large housings. The different variation possiblilites may also be used in an optimum manner if at least the filter unit is placed on wheels. The cleaning device may be so installed in the suction range that the exhaust effect is interrupted at the cleaning positon. In this manner the total inner space of the band may be used as the pure gas channel. However, it appears to be more suitable to install the cleaning device outside of the suction range. Such a cleaning device may be provided for each band portion before this portion moves to the next roller. In such an arrangement the cleaning device may be provided with a suction jet mounted on the crude gas side of the filter band. However, the cleaning effect may be substantially increased when a high-pressure blower jet is used which acts against the exhaust direction. (i.e., it blows air in an opposite direction to the exhaust direction) Due to the increased pressure, a very thorough cleaning is obtained immediately so that all "after cleaning" devices which are typically used for cleaning the bands are not required. Even if a portion of the removed powder again enters into the suction flow and must again be cleaned, this only has an inconsequential effect on the cleaning operation. The largest amount of powder falls downwardly and can be collected. The effectiveness of the device is further improved when a separating element is provided on the curde gas side disposed opposite to the blower jet which screens the removed powder with respect to the oncoming flow.

It has been shown that it is very desirable to mount feed belts at the edges of the filter band, and to provide the drive and tensioning rollers with shoulders for guiding the feeding belts. The filter band is then exactly guided and the tension is substantially eased. The filter band may be supported between the rollers in the suction range by apertured plates in a known manner. When an infinitely-variable motor drive is provided for the filter band, the band speed at different charge loads may be easily adjusted and this adjustment may be carried out by an automatic control with predetermined or given measuring values.

It appears to be especially advantageous to combine the filter band with a separating device for the recovered powder. A vibrating screen may be mounted on the housing beneath the filter unit, and beneath the vibrating screen a detachably mounted conveyor container is provided having an air bottom and a plurality of injectors for the recovered powder. In this manner, the total space requirement is reduced. This pertains merely to the spatial arrangement of the spray housing and the combined filter and separating unit. Coupling lines between the filter unit and the separating unity may be completely eliminated.

As a result, the suction blower may be mounted in an exhaust line of the filter unit. The exhaust line may be used as a combined exhaust and pressure relief channel and may have a pressure relief plate or face. When using a high pressure flame closure or an explosion suppressor, an absolute filter may be used.

The exhaust line with the suction blower may be mounted on the housing of the filter unit with rapid-locking locks or coupling means. Therefore, changes, for example, changing spray powder colors can be executed with a few uncomplicated manipulations.

In a known manner, a vibrating generator may be installed in the housing bottom. In this manner, the powder may be processed in an orderly manner even if the housing bottom has a very low incline. The total height of the device is kept as small as with integrated filter devices. A high pressure blower which is coupled with the blower jets may be used for a further use, if it is coupled at the suction side to a vacuum filter which may be used for cleaning the inside of the housing.

Other objects and features of the present invention will become apparent from the following detailed description when taken in connection with the accompanying drawings which disclose one embodiment of the invention. It is to be understood that the drawings are designed for the purpose of illustration only, and are not intended as a definition of the limits and scope of the invention.

In the drawings, wherein similar reference characters denote similar elements throughout the several views.

Figure 1:
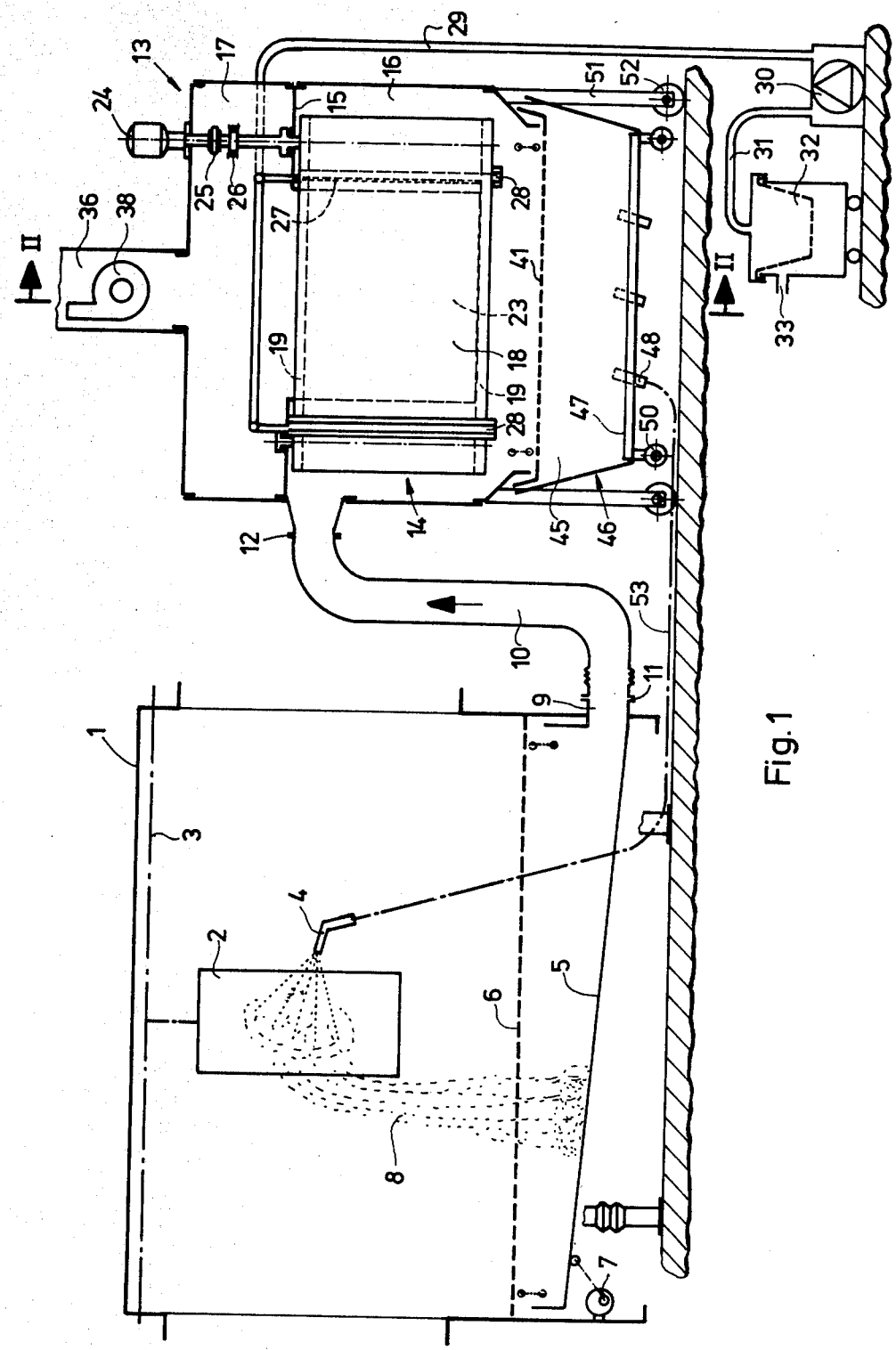
FIG. 1 is a schematic side view of a device embodying the present invention with a combined filter and separating unit coupled with a powder-spray housing.

Referring now in detail to the drawings, a powder-spray housing 1 is shown through which the workpieces 2 are fed by means of a conveyor belt 3 and which are then sprayed with powder by means of an electrostatic spray gun 4. The housing bottom 5 is shaped like a flat funnel and is covered by a detachable grate 6. Housing bottom 5 is also coupled to a vibrating device 7 which feeds the dropped, superfluous powder 8 along the vibrating housing bottom 5 to an output opening 9.

This feeding movement is supported by the vacuum from a suction or vacuum line 10 disposed at this output opening. Suction line 10 is coupled to spray housing 1 and to a housing 13 of a filter unit 14 by means of detachable, rapid-locking couplings 11 and 12, respectively. Housing 13 is separated by a horizontal separating wall 15 into a lower crude or impure gas chamber 16 to which the suction line 10 is coupled and an upper pure gas chamber 17.

Two filter units 141 and 142 of filter unit 14 are suspended from horizontal separating wall 15. (see FIGS. 2 and 3) Filter units 141 and 142 are provided with an endless filter band 18, as shown in FIG. 5. Such filter bands are normally made of a fleece-like material which has a very low tensile strength. The bands are reinforced at both edges by feed belts 19 which are mounted on the inside of such filter bands and which not only act to drive the filter band but also facilitate an improved guiding of the band.

Figure 2:
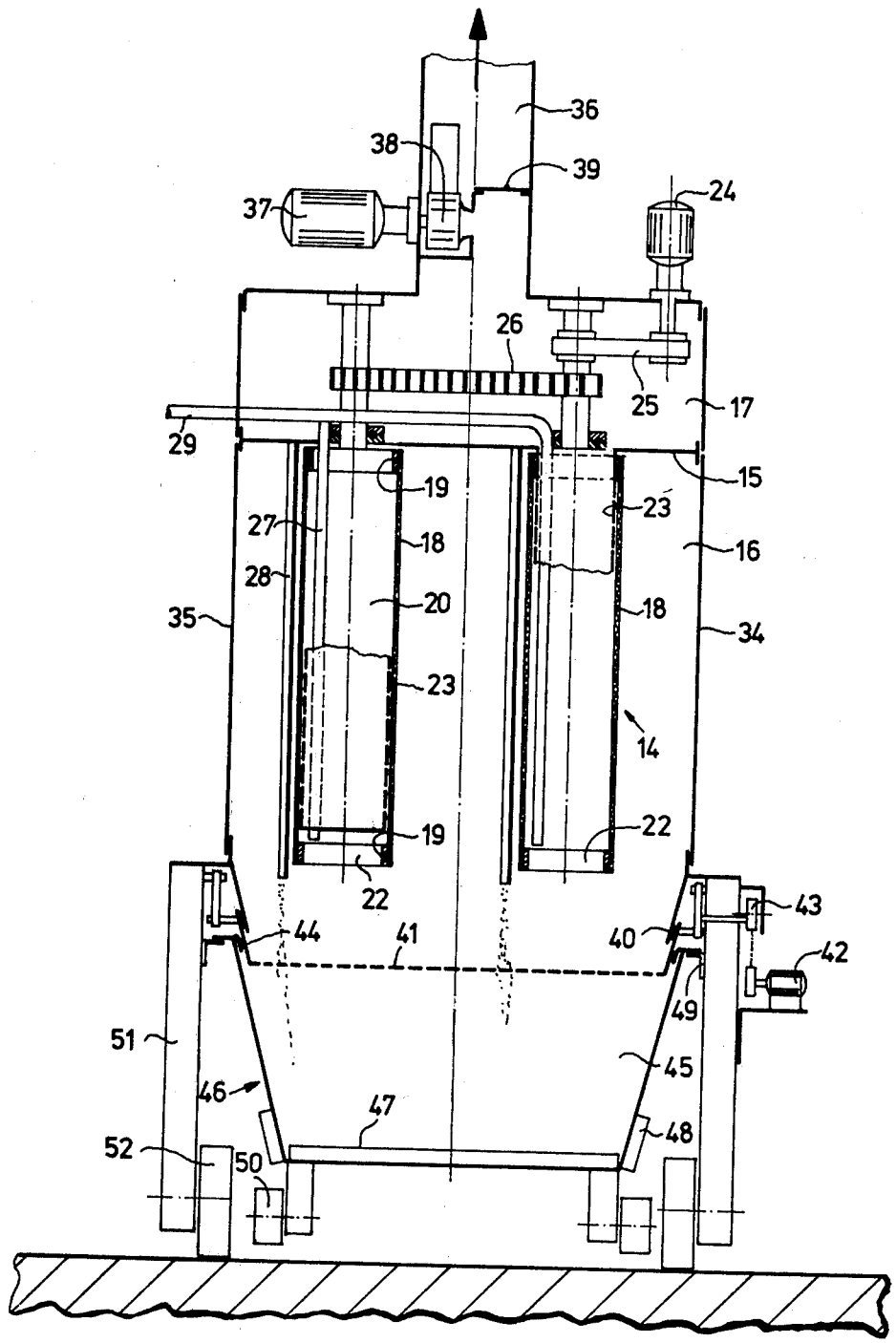
FIG. 2 is a sectional view through this unit taken along line II—II, of FIG. 1.

Filter bands 18 move with the aid of these feeding belts 19 around a drive roller 20 and a tension roller 21. As can be seen in FIG. 2, both of these rollers have shoulders 22 for the transport or feeding by belts 19, so that the remaining interior surface portion of the filter band 18 (i.e., other than the edge portions thereof covered by belts 19) is immediately engaged by the circumferential surface of the rollers.

A shaft-like suction pocket 23 extends from the intermediary bottom or separating wall 15 between the two rollers, that is between the two side portions 181 and 182 of the rollers. This pocket is completely closed off with respect to its front faces and its sides opposing rollers 20 and 21, while sieve-like apertured walls 231 are disposed facing the band portions 181 and 182. Feeding belts 19 also serve a sealing function at the top and bottom transverse positions thereof.

Figure 3:
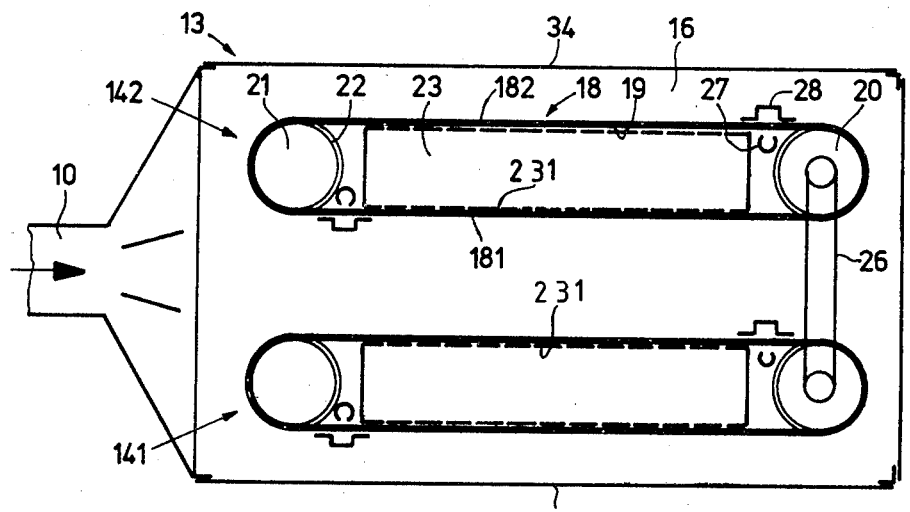
FIG. 3 is a plan view of the filter unit.
Figure 4:
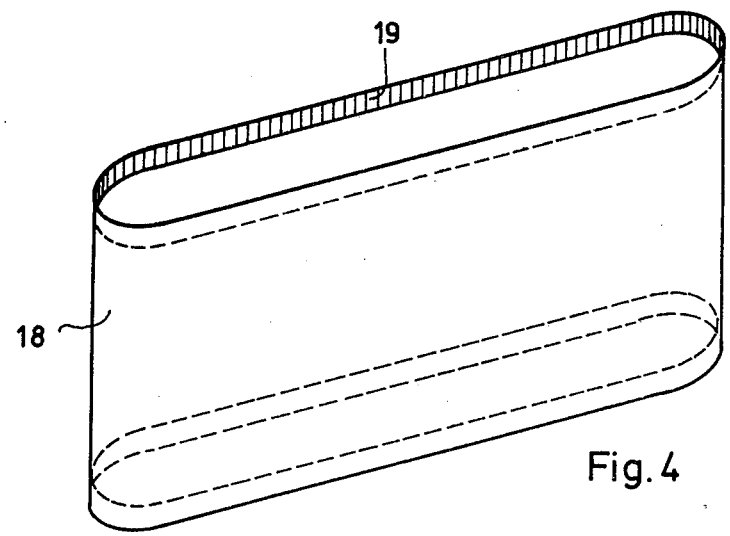
FIG. 4 is a perspective view of a used filter band.

In FIG. 3, all rollers are driven in a clockwise direction. Each band portion 181 and 182 passes a slot-like blower jet 27 located on the interior side thereof and a U-shaped separating element 28 located on the exterior side thereof which is open at its bottom end, before engaging the next roller 21 or 20. Blower jets 27 are coupled to a high pressure blower 30 (see FIG. 1) by means of a line 29. High pressure blower 30 may be coupled with a vacuum filter unit 32 at its suction side by means of a line 31. In a known manner, hoses with suction jets may be coupled to the suction extension 33 of the vacuum filter unit for cleaning the inner space of the spray housing 1 during a color change, for example.

At least one, but preferably two oppositely-arranged side walls 34, 35 of housing 13 may be easily detached, so as to provide easy access to the filter units when the units have to be replaced. The filter band may be replaced by pushing back tension roller 21 against the spring pressure so that the filter band may be drawn down and off and so that a new one may be mounted in the same fashion.

At the upper side of housing 13, an exhaust channel 36 is mounted via rapid-locking locks or coupling means and is coupled with a suction blower 38 which is driven by a motor 37. This exhaust channel simultaneously acts as a pressure relief channel due to the provision of a pressure relief face 39 which runs parallel to the suction flow. The exhaust channel 36 can lead to the outside, but may also be coupled to an absolute filter.

A vibrating screen 41 in the shape of a flat-bottom funnel is coupled to the open underside of housing 13 by means of a seal 40. A vibrating generator 43 is provided for vibrating screen 41 and is driven by a motor 42.

Coupled to the edge of vibrating screen 41 by means of a seal 44 is a conveyor container 45 of a separating device 46 which is provided with an air bottom 47 and a plurality of injectors 48. This separating device is somewhat lifted by mounting means 49 which engage the edges of the associated container 45, so that they can assume the vibrating movement applied by vibrating device 43. When the mounting means 49 is detached, the separating device is lowered and can be removed by rollers 50 which are mounted between the housing supports 51 and which, in turn, may be mounted on rollers 52.

In accordance with FIG. 1, spray gun 4 is coupled with injectors 48 by a hose 53 (shown in phantom line). The required air pressure for driving the air bottom 41 may be taken from line 29 or a separate compressor which is driven by motor 42 or, more commonly, from the present air pressure line system.

When operating the device the powder which drops and slides along the housing bottom 5 is drawn into the crude gas chamber 16 of housing 13 via the suction flow through line 10 in the direction of the arrow (see FIG. 1). If the powder does not drop immediately onto vibrating screen 41, the powder is deposited, with the aid of the air which is drawn through a filter band 18, onto the exterior surface of a band portion 181, for example, and moves with the band to the adjacent U-shaped separating element 28, at which point air is blown thoroughly through the band from the interior surface thereof along a vertical slot by blower jet 27. Consequently, all of the previously drawn-in and deposited powder particles are blown outwardly and are thereby released from the band. However, due to the separating elements 28, only a minute portion of the blown-out powder returns to the suction flow and is again drawn in by the filter band. The most or major amount of powder deposits or falls within the separating element 28 and drops downwardly to vibrating screen 41. From screen 41, the powder falls into the separating device from where it is drawn off by the plurality of injectors 48 through hose 53 so that it can again be sprayed.

The number of injectors indicate that with one combined filter and separating unit, a plurality of spray housings may be operated or a plurality of spray guns may be used in one spray housing. In large installations it is possible to provide a plurality of filter and separating units in one individual spray housing. Many variations or combinations are thus made possible. When changing spray colors only the filter bands and the separating unit need be replaced. The walls of the spray housing and housing 13 may be vacuumed with a vacuum cleaner coupled to a hose connection 33. All changes are facilitated by the common and separate handling of the filter and separating unit.

Thus, while only one embodiment of the present invention has been shown and described, it will be obvious to those persons of ordinary skill in the art, that many changes and modifications may be made thereunto, without departing from the spirit and scope of the invention.

What is claimed is:

1. A device for recovering powder from powder spray housings and the like which includes a filter unit mounted in a separate filter housing which filter unit which has a crude gas side and a pure gas side separated by a filter element, an exhaust coupled to the pure gas side of the filter unit and a cleaning device coupled to the filter unit for effecting the continuous removal of powder drawn against the filter element, the improvement comprising:

said filter element including at least one endless filter band which is movable along said pure gas side and is received for movement about a drive roller and a tension roller spaced-apart from one another, said endless filter band having two oppositely-disposed band portions disposed between said rollers, each of which separate said crude gas side from said pure gas side; and said cleaning device being disposed to remove powder from said band.

2. The device according to claim 1, wherein said cleaning device is disposed adjacent to said band and defines a cleaning position with respect thereto and wherein said cleaning device is disposed in an area adjacent to said band which is subjected to the exhaust effect of said exhaust so that said exhaust effect is interrupted at said cleaning position.

3. The device according to claim 1, wherein said band portions define a pure gas channel therebetween and wherein said cleaning device is mounted outside of said pure gas channel.

4. The device according to claim 2 or 3, wherein said cleaning device includes an exhaust jet disposed on said crude gas side of said filter band.

5. The device according to claim 1, 2, or 3 wherein said cleaning device includes at least one high pressure blowing jet which acts oppositely to the exhaust direction of said exhaust.

6. The device according to claim 5, wherein a separating element is provided opposite to said blower jet one said crude gas side which screens the removed powder with respect to the intake flow range.

7. The device according to claim 5, wherein a high pressure blower is coupled with said at least one blower jet on the pure gas side and is coupled with a vacuum filter for cleaning the spray housing.

8. The device according to claim 1, wherein said band has lateral edges and feeding belts are mounted on the edges of said filter band.

9. The device according to claim 8, wherein shoulders for guiding said feeding belts are provided on said drive and tension rollers.

10. The device according to claim 1, wherein an infinitely-variable motor drive is provided for driving said drive roller and, in turn, said filter band.

11. The device according to claim 1, wherein the spray housing has a bottom and a vibration generator is provided for the spray housing bottom.

* * * * *